(12) United States Patent
Copenhaver (10) Patent No.: US 7,430,990 B1
(45) Date of Patent: Oct. 7, 2008

(54) MECHANICAL ROPING STEER APPARATUS WITH PIVOTING HORNS AND PIVOTING HORN SUPPORT

(76) Inventor: Alan R. Copenhaver, 29724 Heron Ave., Hinton, IA (US) 51024

( * ) Notice: Subject to any disclaimer, the term of this patent is extended or adjusted under 35 U.S.C. 154(b) by 0 days.

(21) Appl. No.: 11/890,337

(22) Filed: Aug. 6, 2007

Related U.S. Application Data (63) Continuation-in-part of application No. 11/455,167, filed on Jun. 16, 2006.

(51) Int. Cl.
*A01K 15/02* (2006.01)
*A63B 67/06* (2006.01)
*G09B 19/00* (2006.01)

(52) U.S. Cl. .................. 119/839; 273/338; 273/339; 273/359; 273/367; 434/258; 434/219; 434/247; 434/225

(58) Field of Classification Search .............. 119/839; 43/2; 273/338, 339, 359, 367; 434/219, 434/267, 225, 258
See application file for complete search history.

(56) References Cited

U.S. PATENT DOCUMENTS

| | | | | |
|---|---|---|---|---|
| 3,066,939 | A | * | 12/1962 | Sprout .................. 273/338 |
| 4,266,779 | A | | 5/1981 | English |
| 4,364,570 | A | * | 12/1982 | Hallam .................. 273/338 |
| 4,451,045 | A | | 5/1984 | Fesmire |
| 6,497,411 | B1 | * | 12/2002 | Nelson .................. 273/338 |
| 6,736,399 | B1 | | 5/2004 | Copenhaver |
| 2004/0101811 | A1 | * | 5/2004 | Gipson .................. 434/247 |

FOREIGN PATENT DOCUMENTS

CA 2187825 4/1998

OTHER PUBLICATIONS

GP Manufacturing, LLC, "Speed Roper & Speed Header" website, product information, Jan. 8, 2007, 10 pages, www.teamroper.com/speed.

* cited by examiner

*Primary Examiner*—Michael R. Mansen
*Assistant Examiner*—Joshua J Michener
(74) *Attorney, Agent, or Firm*—Jeffrey A. Proehl; Woods, Fuller, Shultz & Smith, PC

(57) ABSTRACT

A mechanical roping steer apparatus for practicing roping of a steer is disclosed that comprises a support assembly for engaging the ground surface and a steer assembly mounted on the support assembly. The support assembly may comprise a main frame and a pair of lateral skids mounted on the main frame, and the pair of lateral skids may each be pivotable with respect to the main frame. In some embodiments, the steer assembly includes a frame and a body covering assembly mounted on the frame and configured to move with respect to the frame in response to movement of the steer assembly across the ground surface. In some embodiments, the steer assembly comprises includes a frame and a head assembly mounted on the frame and configured to move with respect to the frame in response to movement of the steer assembly across the ground surface.

17 Claims, 13 Drawing Sheets

MECHANICAL ROPING STEER APPARATUS WITH PIVOTING HORNS AND PIVOTING HORN SUPPORT

REFERENCE TO RELATED APPLICATION

This application is a continuation-in-part of my patent application Ser. No. 11/455,167, filed Jun. 16, 2006.

BACKGROUND OF THE INVENTION

1. Field of the Invention

The present invention relates to steer roping practice apparatus and more particularly pertains to a new mechanical roping steer apparatus with improved head and body movement and apparatus tracking features for providing a highly realistic reproduction of the structure and movement of a steer to enable highly effective roping practice without using a live steer.

2. Description of the Prior Art

Team steer roping events of rodeos involve coordinated horse riding and steer roping by two persons who participate as a team. In this rodeo event, a steer is released from a confinement pen and runs out into the rodeo arena. One team member, known as the "header", rides a horse to the left of and slightly behind the steer, and the other team member, known as the "heeler", rides a horse to the right of and also slightly behind the running steer. As the steer runs, the header team member first ropes, or lassos, the horns of the steer and secures the end of the rope to the horn of the saddle of the header's horse, and turns his or her horse to the left to cause the steer to also turn to the left and then pull the steer in the leftward direction. Once the steer has taken at least one stride after the turn, the heeler team member attempts to rope or lasso the hind legs of the steer so that the steer may be held by the ropes of the header and heeler. Since the team steer roping event is timed, the more quickly these steps can be executed, the more successful the team is likely is to be in rodeo competition. Thus, practice of the header and heeler duties by the team members is highly desirable to prepare a team for actual competition. The movement of the steer's hind legs makes the heeler's duties more challenging than the header's duties, and thus the heeler team member can be helped by practice, especially with conditions that are as close as possible to actual competition.

The existence and use of steer roping practice apparatus is known in the prior art. Generally, the use of some type of mechanical practice apparatus is highly desirable, as this avoids the need to gain regular access to a steer to practice on. Mechanical practice apparatus can also provide relatively more practice during a given time period, since a live steer needs to be captured after each run. Further, a mechanical apparatus does not tire after several runs as might a live steer.

One known steer roping practice apparatus is disclosed in my U.S. Pat. No. 6,736,399 (the disclosure of which is incorporated herein in its entirety), which describes an apparatus capable of highly accurate and realistic hind leg movement. However, the realism of the head and body movement in that apparatus is less than optimal, and while suitable for the intended purpose, lacked the advantages that a more realistic simulation of head and body movement might provide. Further, while the movement of the apparatus disclosed in my '399 patent is also highly useful, it has become apparent that the apparatus could more accurately track behind the towing vehicle (or animal) to provide smoother movement, particularly when the apparatus is turned during forward movement.

Further, it has been noted that the release of the looped rope from the simulated steer head could be made easier so that the user does not have to closely approach the apparatus and dismount from the horse to retrieve the looped rope from the simulated steer head. Some simulated steer heads have horns that pivot laterally into an upward position, but no further, which can hamper removal of the looped rope from the horns from a position astride of the steer head. The single metal spring piece used to bias the horns into position can be ejected from the simulated head. Some simulated steer heads allow the whole head to pivot for release of the loop from the horns, but this movement interferes with or prevents head movement that is intended to simulate the normal head movement associated with the walking or running gait of the simulated steer apparatus.

Thus, while the apparatus disclosed in my earlier patent provided an improvement in realism over the then existing roping practice apparatus, it has become that further aspects of that invention could be improved in realism for even greater accuracy in the simulation of steer movement.

SUMMARY OF THE INVENTION

In view of the foregoing disadvantages inherent in the known types of steer roping practice apparatus now present in the prior art, the present invention provides a new mechanical roping steer apparatus with improved head and body movement and apparatus tracking features, wherein the same can be utilized for providing a highly realistic reproduction of the structure and movement of a steer to enable highly effective roping practice without using a live steer.

In general, the invention provides a mechanical roping steer apparatus with a body assembly and a head assembly that are able to move in a highly natural manner that corresponds to the speed of the movement of the apparatus over a ground surface, so that increasing the speed of movement of the apparatus over the ground causes a faster movement of the body assembly and the head assembly, and decreasing the speed of movement of the apparatus of the ground causes a slower movement of the body assembly and the head assembly.

To attain this, the present invention generally comprises, in one embodiment, a mechanical roping steer apparatus for practicing roping of a steer that comprises a support assembly for engaging a ground surface. The support assembly comprises a main frame and a pair of lateral skids mounted on the main frame for contacting the ground surface. The apparatus further comprises a steer assembly located rearwardly of, and being mounted on, the support assembly. The pair of lateral skids are each pivotable with respect to the main frame.

In other embodiments, the mechanical roping steer apparatus for practicing roping of a steer comprises a support assembly for engaging a ground surface and a steer assembly located rearwardly of, and being mounted on, the support assembly. The steer assembly may comprise a frame and a body covering assembly mounted on the frame and configured to move with respect to the frame in response to movement of the steer assembly across the ground surface.

In still other embodiments, the mechanical roping steer apparatus for practicing roping of a steer comprises a support assembly for engaging a ground surface and a steer assembly located rearwardly of, and being mounted on, the support assembly. The steer assembly comprises a frame and a head assembly mounted on the frame and configured to move with respect to the frame in response to movement of the steer assembly across the ground surface.

In yet still other embodiments, a head device is disclosed for a mechanical steer roping apparatus, and the head device comprises a head form, a horn support pivotally mounted on the head form so as to be pivotable about a primary axis with respect to the head form, and a pair of horns mounted on the horn support. The pair of horns are pivotable with respect to the horn support, and each of the horns are pivotable about an axis that is oriented substantially perpendicular to the primary axis about which the horn support is pivotable. The head device may further include a biasing member configured to bias the horn support into a position and to bias at least one of the horns into a position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
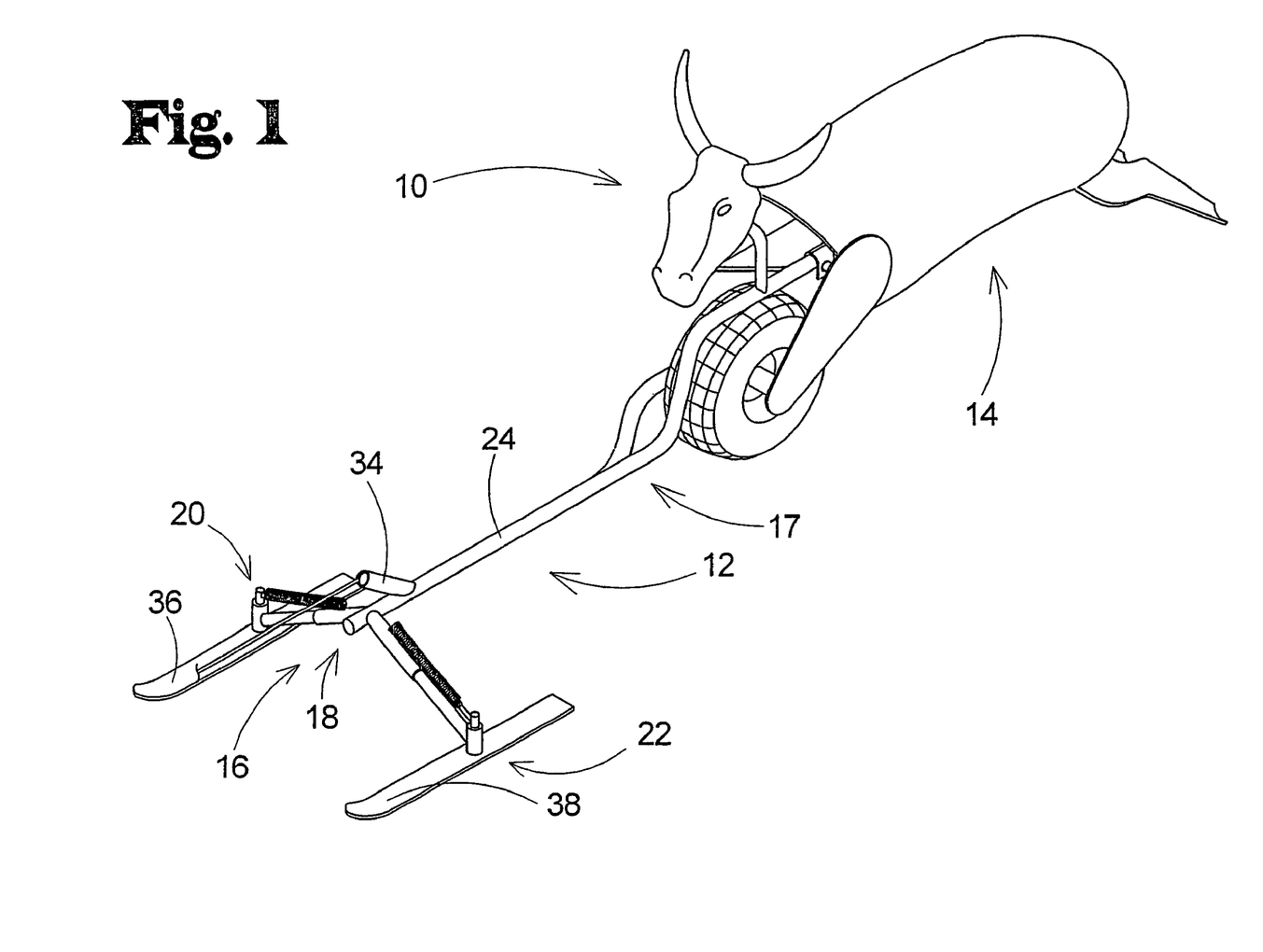
FIG. 1 is a schematic perspective view of a new mechanical roping steer apparatus according to the present invention and particularly illustrating the improved support assembly and the improved steer assembly.
Figure 2:
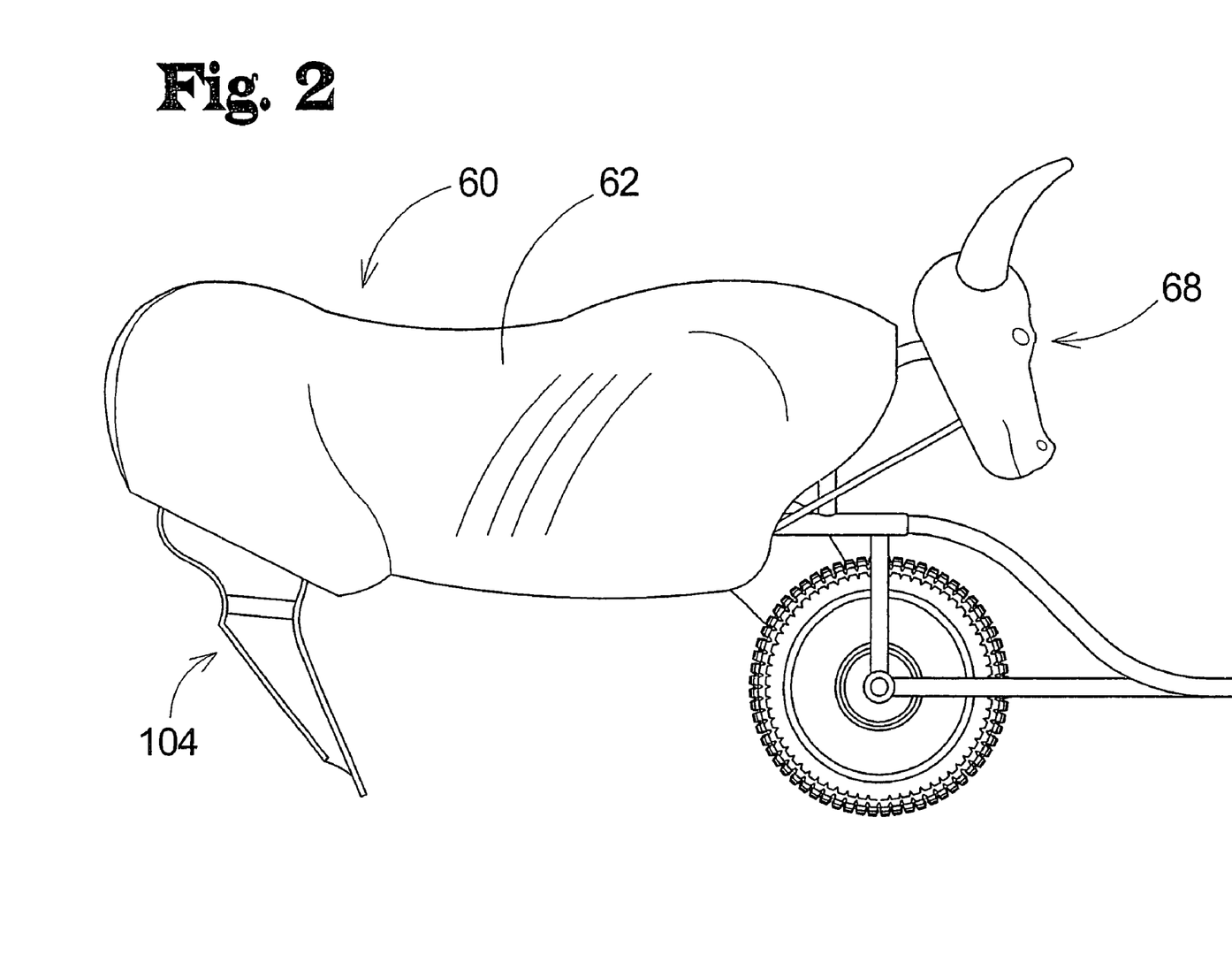
FIG. 2 is a schematic side view of the steer assembly of the present invention.
Figure 3:
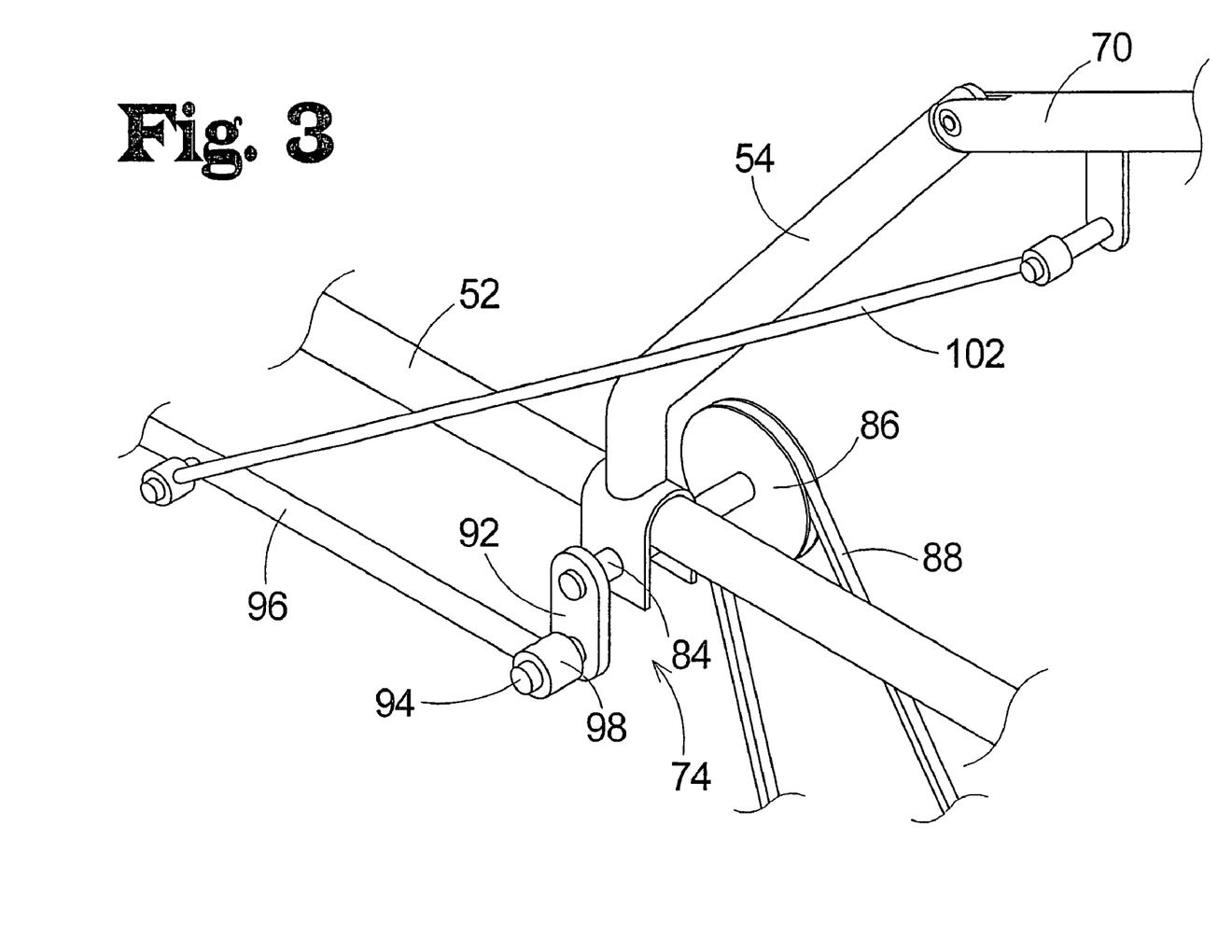
FIG. 3 is a schematic perspective view of the steer assembly of the present invention with portions of the body cladding removed to reveal detail of the head movement assembly.
Figure 4:
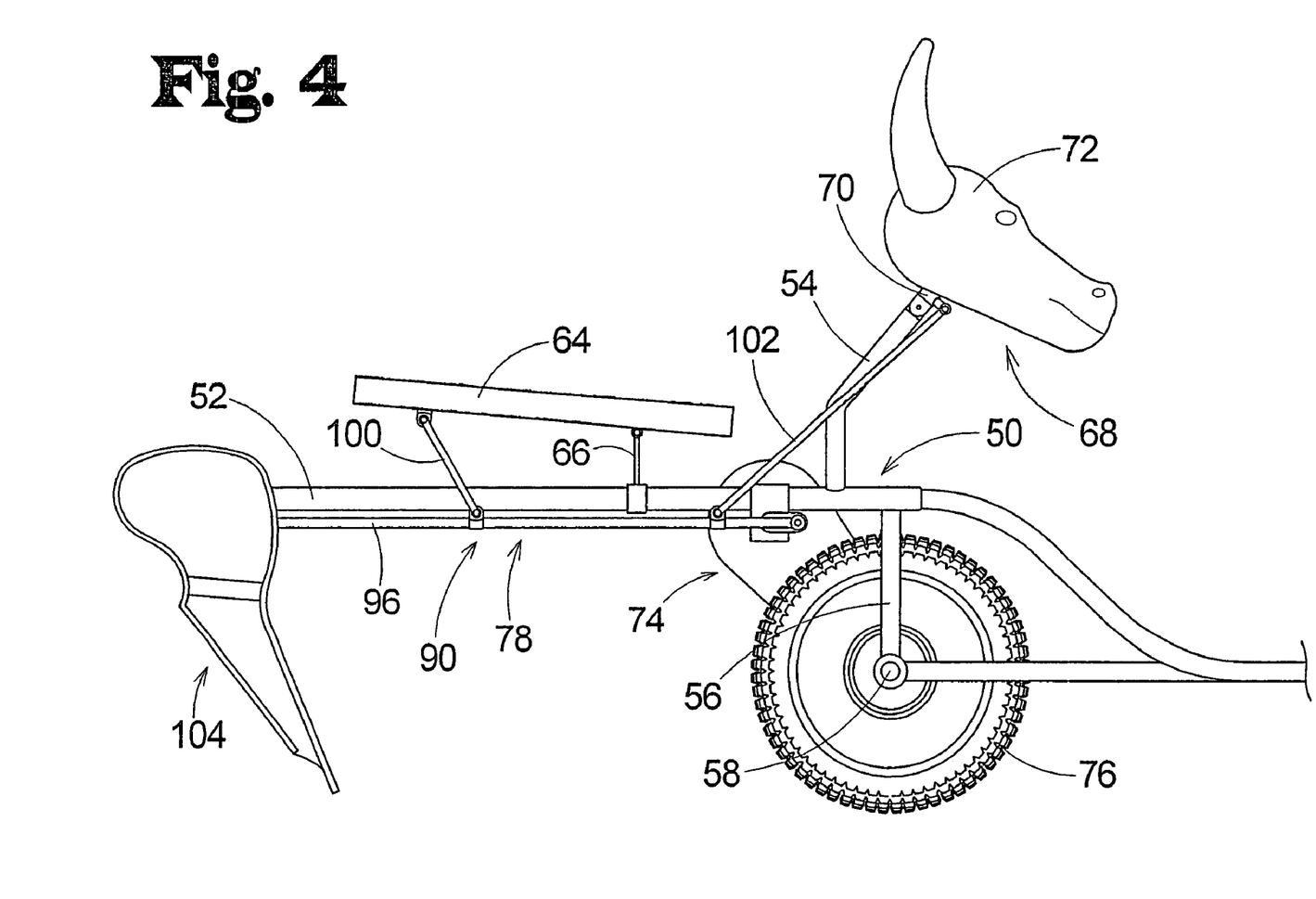
FIG. 4 is a schematic side view of the present invention with the body covering removed to reveal detail of the head movement assembly and the body movement assembly in a first position.
Figure 5:
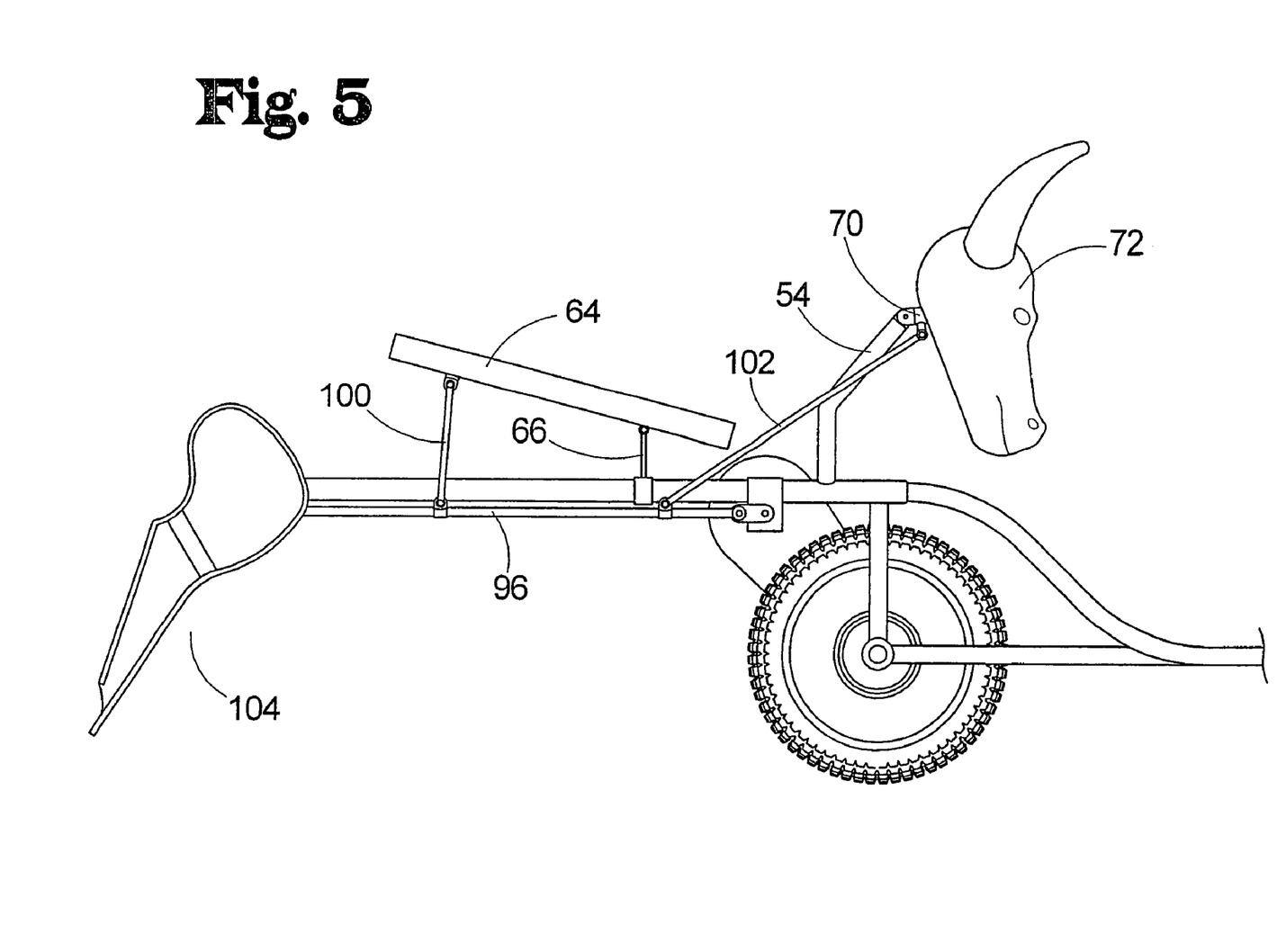
FIG. 5 is a schematic side view of the present invention with the body covering removed to reveal detail of the head movement assembly and the body movement assembly in a second position.
Figure 6:
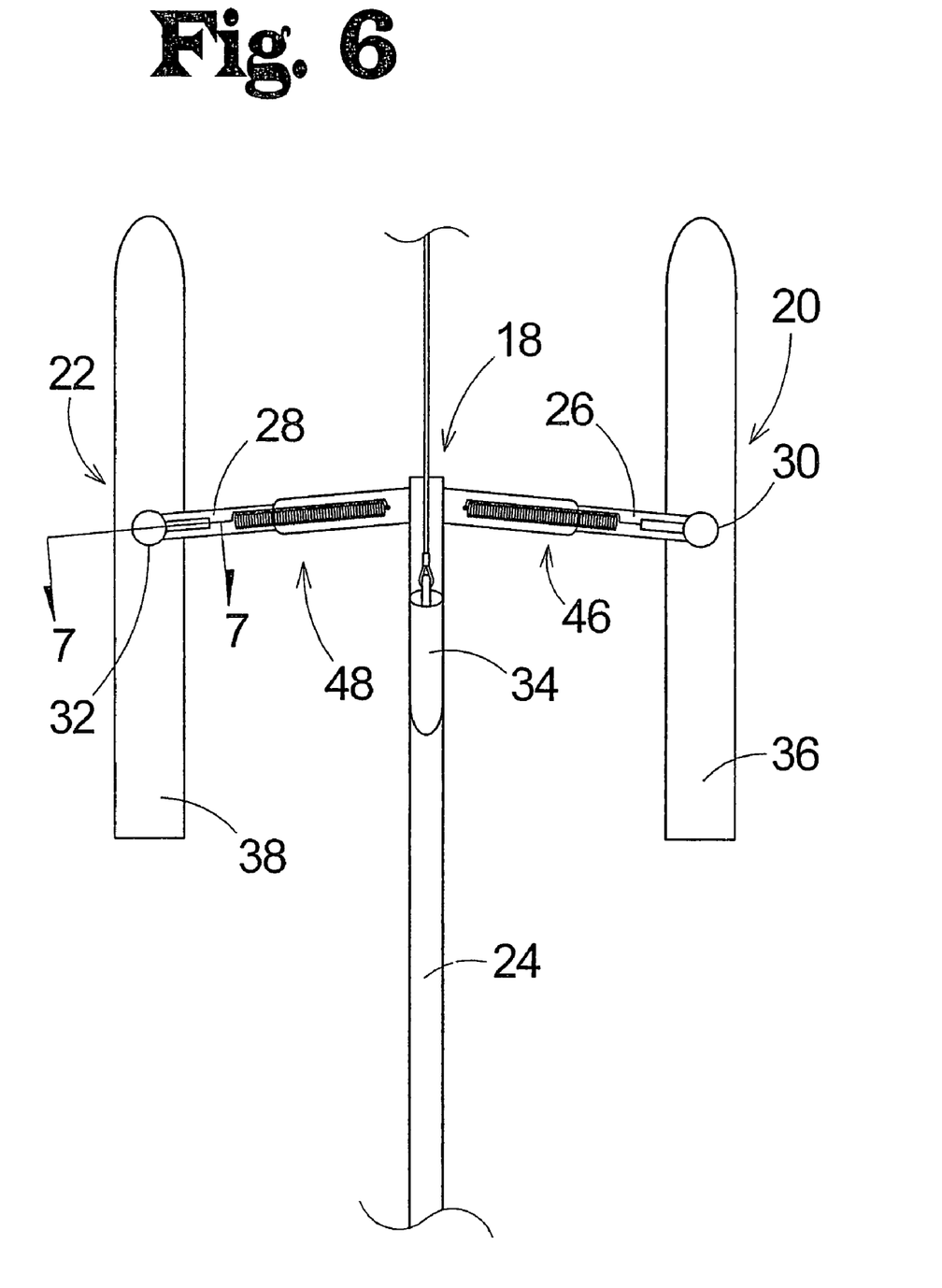
FIG. 6 is a schematic top view of the support assembly of the present invention.
Figure 7:
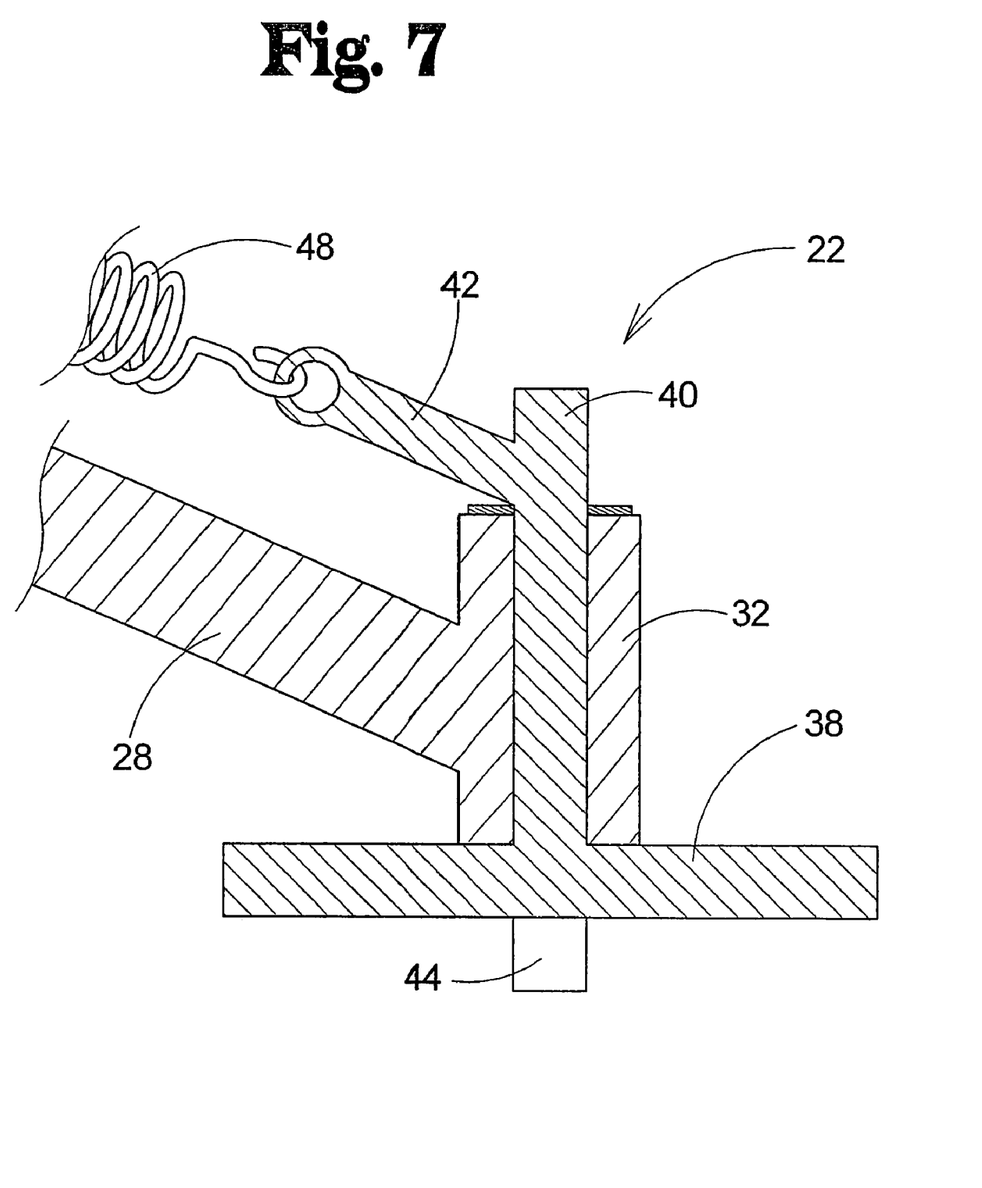
FIG. 7 is a schematic sectional view of a skid assembly of the support assembly taken along line 7-7 of FIG. 6.
Figure 8:
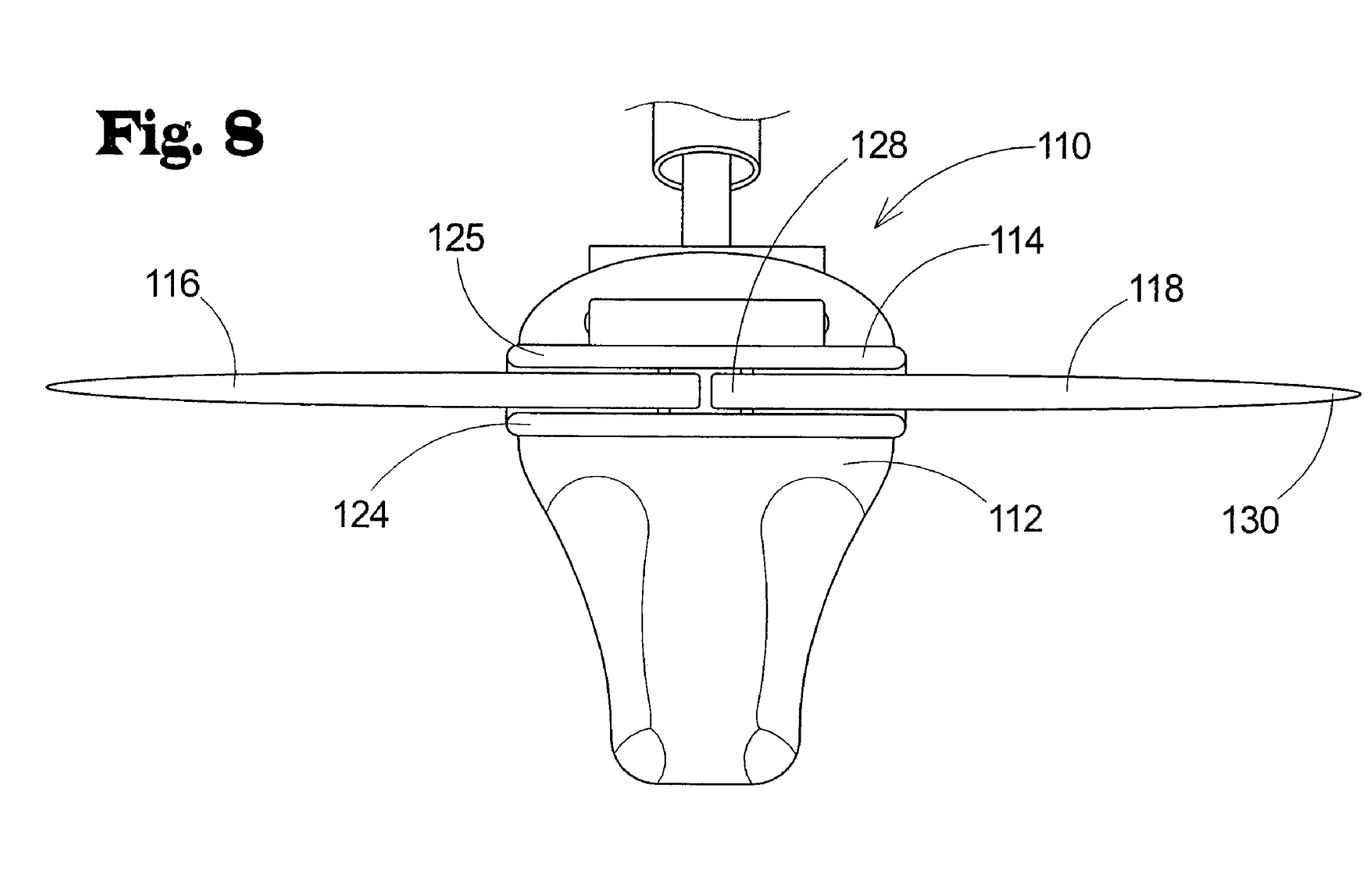
FIG. 8 is a schematic top view of a head device of the present invention showing the horns in the normal position.
Figure 9:
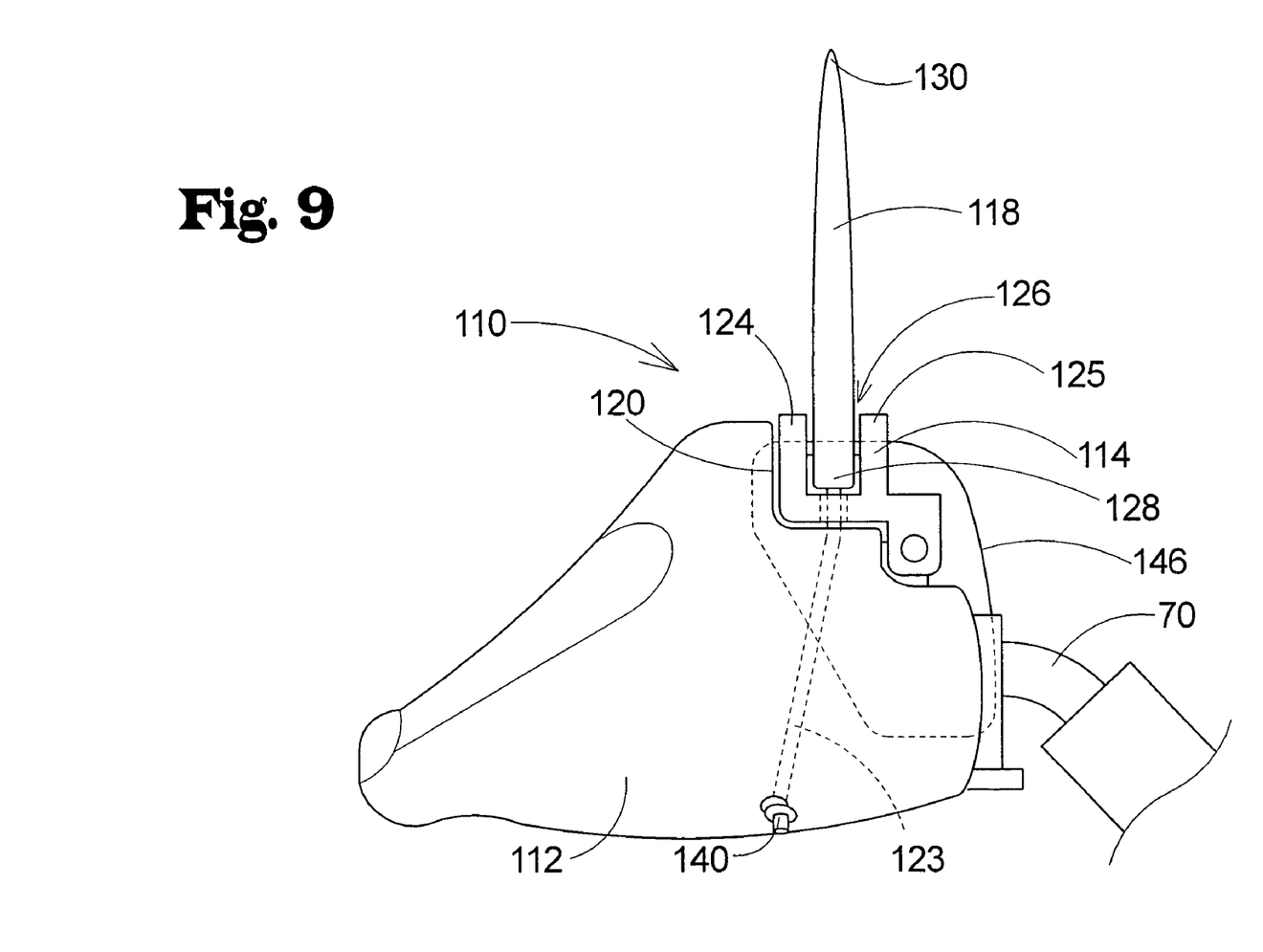
FIG. 9 is a schematic side view of the head device of the present invention showing the horn support in a forward position.
Figure 10:
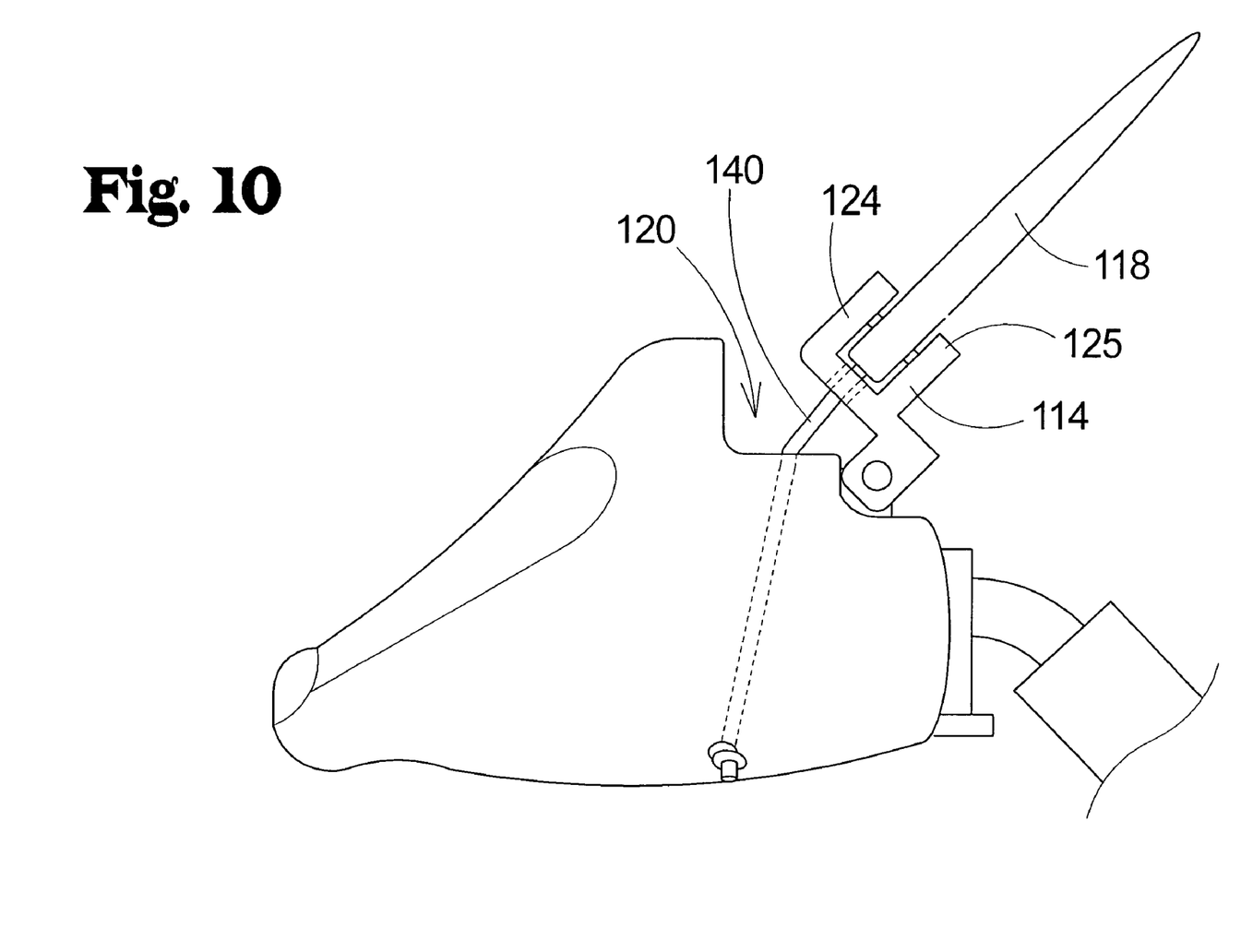
FIG. 10 is a schematic side view of the head device of the present invention showing the horn support in a rearward position.
Figure 11:
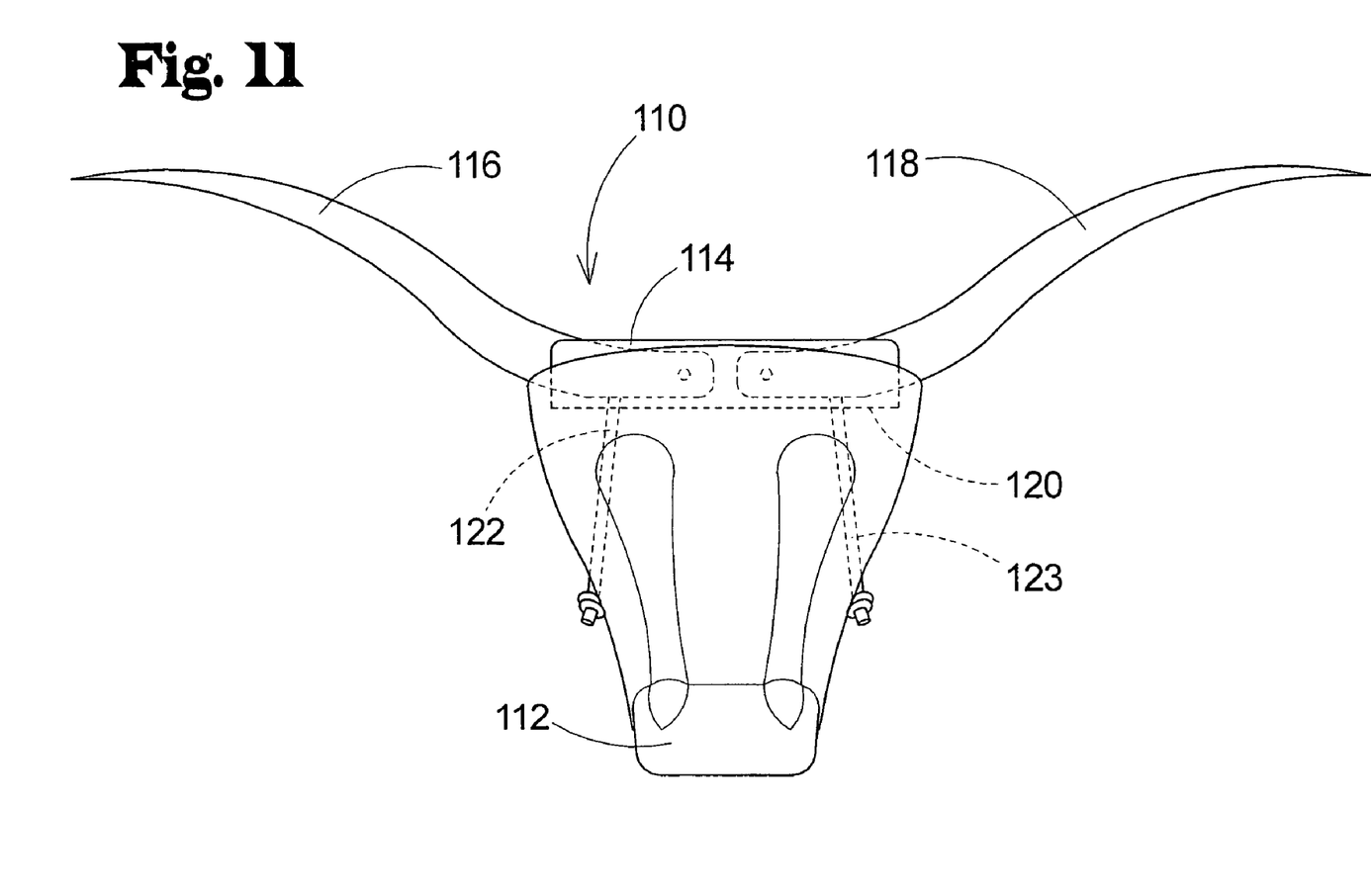
FIG. 11 is a schematic front view of the head device of the present invention showing the horns in the normal position.
Figure 12:
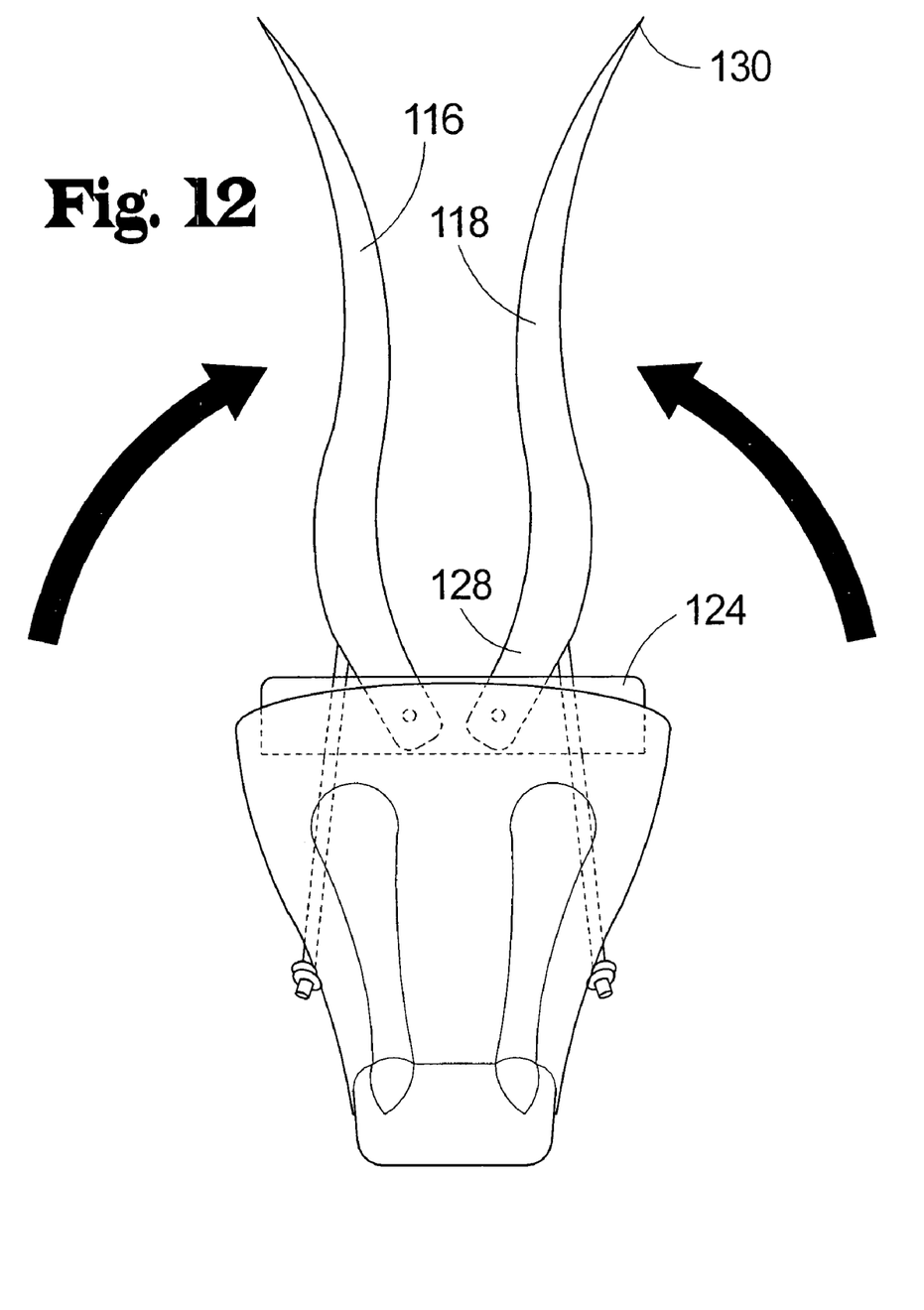
FIG. 12 is a schematic side view of the head device of the present invention showing the horns in the release position.
Figure 13:
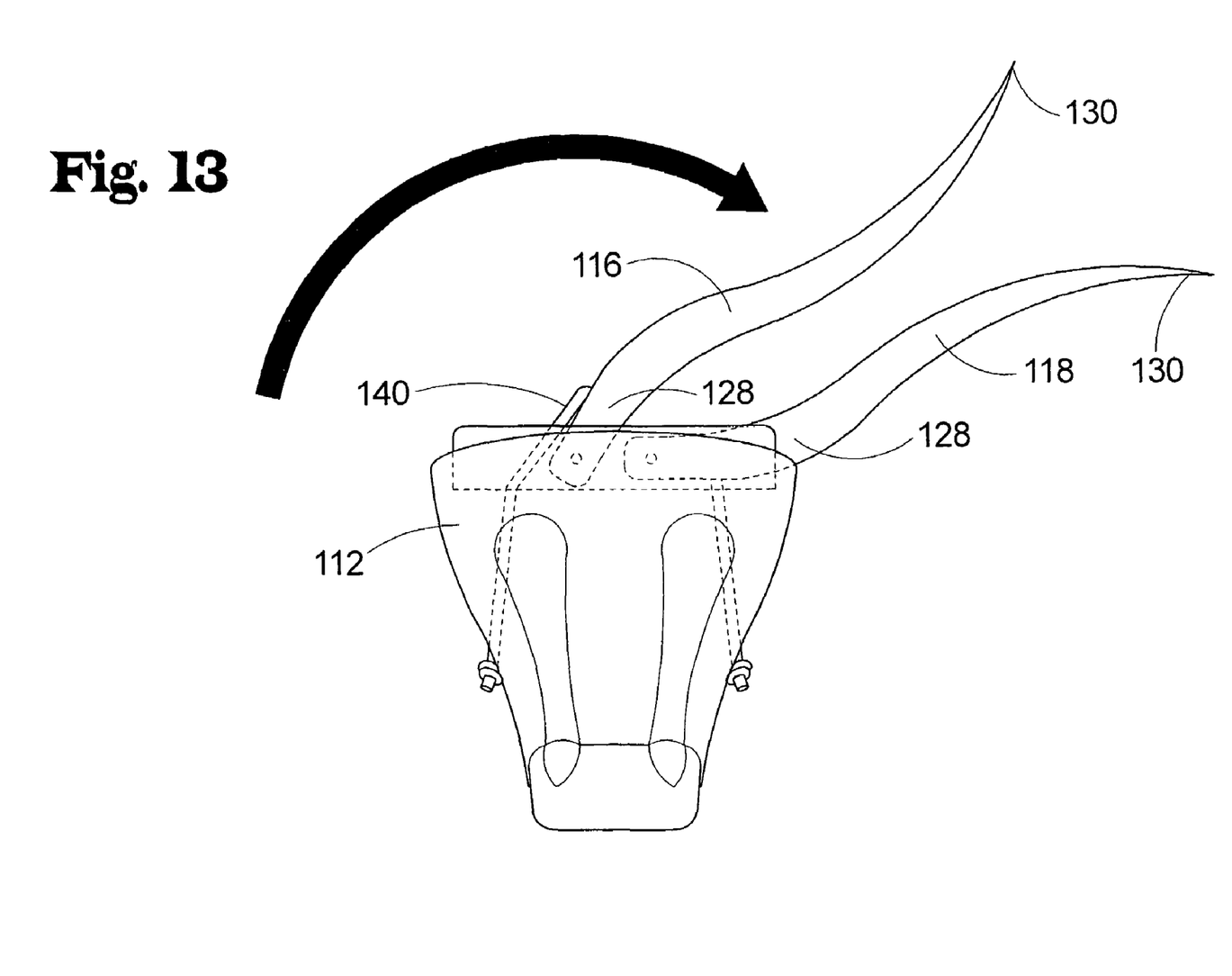
FIG. 13 is a schematic side view of the head device of the present invention showing one of the horns in the normal position and the other of the horns in the over-release position.

With reference now to the drawings, and in particular to FIGS. 1 through 13 thereof, a new mechanical roping steer apparatus with improved head and body movement and apparatus tracking features embodying the principles and concepts of the present invention and generally designated by the reference numeral 10 will be described.

As best illustrated in FIGS. 1 through 7, the mechanical roping steer apparatus 10 of the invention includes a forward support assembly 12 for engaging a ground surface and a rearward steer assembly 14 located rearwardly of the support assembly.

In greater detail, the support assembly 12 has a front 16 and a rear 17, and comprises a main frame 18 and a pair of lateral skids 20, 22 that are mounted on the main frame for contacting the ground surface. The main frame 18 has a forward end toward the front 16 of the support apparatus 12 and a rearward end toward the rear of the support apparatus. The main frame 18 may include a substantially central longitudinal member 24 extending between the forward and rearward ends of the main frame, and may comprise a bar or tube, for example.

The main frame 18 may further include a pair of skid support members 26, 28 for supporting the lateral skids 20, 22. Each of the skid support members 26, 28 may extend laterally outward from the longitudinal member 24 in substantially opposite directions. Each skid support member 26, 28 may have a length that is adjustable to thereby adjust a lateral separation of the lateral skids 20, 22, and may include at least two portions which may be telescopically mounted together to permit a first one of the portions to extend and retract with respect to a second one of the portions. Each of the skid support members 26, 28 may extend downwardly and outwardly from the longitudinal member 24 such that the skid support members are inclined with respect to the ground surface.

Still further, the main frame 18 may include a pair of skid mounting members 30, 32 each mounted on an outboard end of one of the skid support members 26, 28. Each of the skid mounting members 30, 32 may be configured to permit pivoting of the respective skid 20, 22 with respect to the main frame 18. Each of the skid mounting members 30, 32 may comprising a sleeve with a passage extending therethrough in a substantially vertical orientation.

A tow attachment member 34 may be included as part of the main frame 18 for attaching to a towing cord, and may extend generally upwardly, and optionally forwardly, from the longitudinal member 24. The tow attachment member 34 may be mounted at a medial position on the longitudinal member 24 located rearwardly of the skid support members 26, 28.

Turning to the pair of lateral skids 20, 22, each skid may include a skid member 36, 38 has a forward end and a rearward end. Each skid member 36, 38 may have a front end portion that is tapered in lateral width toward the forward end. Each skid member 36, 38 has an upper side and a lower side, and in some embodiments the front end portion of the skid member curves upwardly so that the lower side is convex. Each lateral skid 20, 22 may further comprise a mounting post 40 that is pivotally mounted on one of the skid mounting members 30, 32 of the main frame. The mounting post 40 extends upwardly from the upper side of the skid, and is positioned in the passage of the skid mounting member 30, 32. The mounting post 40 is preferably substantially freely pivotable with respect to the skid mounting member. An arm 42 may extend outwardly from the mounting post 40 in a direction substantially perpendicular to an axis of rotation of the mounting post.

A significant feature of each of the lateral skids 20, 22 is a keel 44 for biasing a longitudinal axis of the skid member 36, 38 toward a parallel alignment with direction of movement of the skid member across the ground surface. The keel 44 extends downwardly from the lower side of the skid member 36, 38. The keel 44 may be located toward the front of the skid member, such as a position located forwardly of the mounting post 40 to thereby bias a rearward portion of the skid member downwardly toward the ground surface. The keel 44 may have a length less than half of a length of the skid member 36, 38 between the forward and rearward ends of the skid member. In some embodiments, the length of the keel 44 is approximately one-fifth of the length of the skid member 36, 38.

The support assembly 12 may also include a pair of skid biasing assemblies 46, 48, with each skid biasing assembly biasing one of the lateral skids 20, 22 into an orientation that is substantially parallel to a longitudinal axis of the main frame 18. Each of the skid biasing assemblies 46, 48 may be mounted on one of the skid support members 30, 32 and the arm 42 of the mounting post 40 of the respective lateral skid 20, 22. The skid biasing assemblies 46, 48 may resist elongation, so that the elongation in the skid biasing assembly that results from the rotation of the respective skid (in either the inward or outward direction) is resisted by the assembly, and the assembly tends to contract to the shortest possible length and thereby orient the skid parallel to the longitudinal axis of the main frame. Each of the skid biasing assemblies 46, 48 may comprise a tension spring that is linked to the skid support member and the arm of the corresponding lateral skid, and thus is stretched when the respective skid is rotated either inwardly or outwardly from a neutral position parallel to the longitudinal member 24. It will be appreciated by those skilled in the art that the keel 44 discussed above also tend to act to align the longitudinal axis of the skid with the direction of travel.

Turning now to the steer assembly 14 of the invention, which is mounted on the rear of the support assembly 12, the steer assembly 14 may include a frame 50 that is mounted on the support assembly 12 and has a forward end and a rearward end. The frame may comprise a spine member 52 that extends from the forward end to the rearward end of the frame 50. In some embodiments, the spine member 52 is substantially horizontally oriented. The frame 50 may also include a head support member 54 that is mounted on the spine member 52, and extends generally upwardly from the spine member. The head support member 54 may be located toward the forward end of the frame, and may extend generally upwardly and forwardly from the spine member. The frame 50 may also include a wheel support member 56 that is mounted on the spine member 52, and may extend downwardly from the spine member at a location toward the forward end of the frame. An axle 58 may be mounted on the wheel support member 56 so that the axle is located below the spine member 52.

The steer assembly 14 may further include a body covering assembly 60 for providing a realistic appearance, as well as realistic movement, to the steer assembly. The body covering assembly 60 may comprise a body covering 62 for covering at least a portion of the frame 50. The body covering 62 may have an outer surface that is contoured to resemble the body of a calf. The body covering 62 may form an inner cavity, and is preferably formed of a flexible material. The body covering 62 may include, for example, a portion that resembles the back of the body of the steer, and well as the sides of the body of the steer. A body support member 64 may be provided as part of the steer assembly 14 to support the body covering 62 on the frame, and the body covering 62 may be mounted on the body support member. The body support member 64 may be positioned in the inner cavity of the body covering. The body support member 64 may be mounted on the spine member 52, and may be pivotable with respect to the spine member to move the body covering 62 with respect to the spine member. The body support member 64 may be oriented so as to extend generally upwardly and rearwardly with respect to the spine member. The body support member 64 has a forward end toward the forward end of the frame and a rearward end toward the rear of the frame. The body covering assembly 60 may further include an elevating member 66 mounted on the spine member and extending upwardly from the spine member. The body support member 64 is pivotally mounted on the elevating member 66. The elevating member 66 may be connected to the body support member 64 toward the forward end of the body support member. The body support member 64 pivots on the elevating member 66 along an axis that is oriented perpendicular to the longitudinal axis of the frame, to thereby raise the hindquarters region of the body covering 62 upwardly and downwardly with respect to, for example, the shoulder region of the body covering 62.

Another significant feature of the invention is the head assembly 68 that is pivotable with respect to the frame 50. To achieve this, the head assembly 68 may be mounted on the frame in a pivotable manner. The head assembly 68 may comprise a head pivot member 70 that is pivotally mounted on the head support member 54 of the frame. The head pivot member 70 may be mounted on an upper end of the head support member 54 to permit head pivot member to pivot with respect to the member 54. The head pivot member 70 is mounted on the head support member 54 to permit the head to pivot along an axis oriented transverse to the frame 50 to cause the head to bob up and down. The head assembly 68 may also include a head form 72 that has a shape that generally resembles the head of a steer, and that is mounted on the head pivot member 70.

The steer assembly 14 further includes an actuation assembly 74 for transferring movement from the ground surface to the body covering assembly 60 and the head assembly 68 to cause the body covering assembly and the head assembly to pivot in a cyclical manner that is responsive to the speed of movement of the support assembly and steer assembly across the ground surface. The speed of the movement of the actuation assembly, the body covering assembly, and the head assembly thus increases as the speed of movement of the invention across the ground surface increases, and decreases as the speed of movement of the invention across the ground surface decreases. The actuation assembly 74 may comprise a wheel 76 for being rotated by the ground surface as the support assembly 12 is moved along the ground surface.

The actuation assembly 74 may also include a transferring assembly 78 that is configured to transfer movement of the wheel 76 to the body covering assembly 60 and the head assembly 68 to cause these assemblies to pivot in a cyclical manner. Illustratively, the transferring assembly 78 may comprise a pulley assembly with a driver pulley mounted on the axle 58 of the frame for rotation with the wheel, a pulley axle support 82 mounted on the frame, a pulley axle 84 rotatably mounted on the pulley axle support, and a driven pulley 86 mounted on the frame. The pulley assembly may further include a belt 88 that rotatably connects the driver pulley to the driven pulley 86.

The transferring assembly 78 may further comprise a reciprocating assembly 90 for converting the rotational movement of the pulley axle 84 to a generally reciprocating motion. The reciprocating assembly 90 may comprise an offset plate 92 that is mounted on the pulley axle 84 for rotating the offset plate upon rotation of the pulley axle, and that extends radially outward from a longitudinal axis of the pulley axle. The reciprocating assembly 90 may further include a first stub shaft 94 that is mounted on the offset plate 92 such that a longitudinal axis of the first stub shaft is offset from the longitudinal axis of the pulley axle. The reciprocating assembly 90 also includes an elongate transfer member 96 that has a first end sleeve 98 that is rotatably mounted on the first stub shaft 94. As will be recognized by those skilled in the art, the faster that the wheel is rotated, the faster that the transfer member 96 is reciprocated by the transferring assembly 78, and the slower that the wheel is rotated, the slower that the transfer member 96 is reciprocated by the transferring assembly 78.

The actuation assembly 74 may further include a body actuating member 100 for transferring movement of the reciprocating assembly 90 to the body covering assembly 60. The body actuating member 100 is connected to the reciprocating assembly 90 and the body covering assembly 60 such that reciprocating movement of the reciprocating assembly causes pivoting of the body covering assembly 60. The body actuating member 10 may have a lower end mounted on the transfer member 96 and an upper end mounted on the body support member 64. As a result, the faster that the transfer member 96 is reciprocated by the transferring assembly 78, the faster that the body actuating member 100 is moved and the body support member 64 is pivoted, and the slower that the transfer member 96 is reciprocated by the transferring assembly 78, the slower that the body actuating member 100 is moved and the body support member 64 is pivoted.

The actuation assembly 74 may further include a head actuating member 102 for transferring movement of the reciprocating assembly 90 to the head assembly 68. The head actuating member 102 may be connected to the reciprocating assembly 90 and the head assembly 68 such that reciprocating movement of the reciprocating assembly causes pivoting of the head assembly 68. The head actuating member 102 may have a lower end mounted on the transfer member 96 and an upper end mounted on the head support member 54. Consequently, the faster that the transfer member 96 is reciprocated by the transferring assembly 78, the faster that the head actuating member 102 is moved and the head assembly 68 is pivoted, and the slower that the transfer member 96 is reciprocated by the transferring assembly 78, the slower that the head actuating member 102 is moved and the head assembly 68 is pivoted.

The steer assembly 14 may also include a leg assembly 104 that includes a pair of leg members that are pivotable with respect to the ground surface. The leg assembly 104 may be actuated by the actuation assembly 74 to move pivotally at a speed that corresponds to the speed of movement across the ground surface. A highly suitable structure for accomplishing this is described in my U.S. Pat. No. 6,736,399, which is incorporated herein in its entirety.

In one embodiment of the invention, such as is shown in FIGS. 8 through 13 of the drawings, a head device 110 for a mechanical steer roping apparatus, such as the steer roping apparatus 10 disclosed above in this description. In general, the head device 110 comprises a head form 112, a horn support 114 mounted on the head form, and a pair of horns 116, 118 mounted on the horn support.

In greater detail, the head form 112 forms the main element of the head device 110, and may have an exterior surface that is shaped to generally resemble the head of a cow, and more preferably, a steer. The head form 112 may define a cavity 120 which may be located toward a rear of the head form. The head form 112 may also define a passage 122, and may also define a second passage 123. The passages 122, 123 may be in combination with the cavity 120, and the passages may also extend to the exterior surface of the head form 112, and may terminate at a bottom of the head form, below a chin area of the head form.

The horn support 114 is mounted on the head form 112, and may be pivotally mounted on the head form to permit pivot movement of the horn support with respect to the head form. The horn support 114 may be pivotable about a primary axis, and the primary axis is oriented substantially transverse to a longitudinal axis of the head form 112 that generally extends from the front of the head form to the rear of the head form. The horn support 114 may be pivotable between a forward position (see FIG. 9) in which the horn support is located toward the front of the head form and a rearward position (see FIG. 10) in which the horn support is located toward the rear of the head form. The forward position is the normal or released position of the horn support. The horn support 114 may be positioned in the cavity 120 in the head form 112, and is movable in the cavity. The horn support 114 may include a pair of guide walls 124, 125, and the guide walls may be spaced from each other to form a channel 126.

The horns 116, 118 are mounted on the horn support 114, and may be pivotable with respect to the horn support. Each horn 116, 118 may be pivotable between a normal position (see FIG. 11) and a release position (see FIG. 12). The normal position of the horns 116, 118 may be characterized by the horns extending in substantially opposite directions with respect to the horn support 114 and the head form 112. The normal position may be generally characterized as a position that resembles and simulates the normal position of horns on a steer. The release position of the horns 116, 118 may be generally characterized by both of the horns extending in a direction that is substantially perpendicular to the normal position. It should be recognized that the horns may be independently movable, so that one of the horns may be moved to the release position while the other horn remains in the normal position. In some embodiments, each of the horns 116, 118 may have an over-release position (see FIG. 13) in which the horn is pivoted beyond the release position to an orientation in which the horn is positioned substantially parallel to the other horn which is in the normal position.

In greater detail, a first one 116 of the horns is pivotable about a first axis and a second one 118 of the horns is pivotable about a second axis. The first axis and the second axis may be oriented substantially parallel to each other. The first axis and the second axis may be oriented substantially perpendicular to the primary axis about which the horn support 114 is pivotable. Each of the horns 116, 118 may have a base end 128 and a free end 130. The base end 128 of the horn may be pivotally mounted on the horn support 114, and may be positioned in the channel 126 of the horn support. In some embodiments, the horns 116, 118 collectively form an arc, and may be positioned forward of the primary axis about which the horn support 114 is pivotable. Optionally, the horns 116, 118 may be removable and replaceable with horns of different length or shapes to simulate different types of steers, or to increase or decrease the challenge in roping the horns.

The head device 110 may include structure for biasing at least one, and preferably both, of the horns 116, 118 into the normal position from positions between the normal position and the release or over-release positions. In one embodiment of the biasing structure, an extensible member 140 that is connected to one of the horns 116, 118 and the head form 112 such that pivoting of the horn from the normal position toward the release position extends or stretches the extensible member. The extensible member 140 may comprise a resiliently stretchable cord, and the cord may be flexible. The extensible member 140 may be positioned in the passage 122, 123 of the head form 112.

The extensible member 140 may also resist movement of the horn support 114 out of the forward position and toward the rearward position. The extensible member 140 may extend through the horn support 114, and, for example, may extend through a notch in the horn support. In this arrangement, the extensible member 140 may affect and bias movement of not only the horns 116, 118, but also the horn support 114 through the horns mounted on the horn support.

The resistance to movement of the horns and horn support may be increased or decreased by utilizing extensible members with different resistances to stretching. For example, the extensible member may comprise what is commonly referred to as a "bungee" cord, and bungee cords of different resistances to stretching may be employed.

In some embodiments, the extensible member 140 may include an enlarged portion on a first end for preventing movement of the first end through the passage and an enlarged portion on a second end for preventing movement of the second end through an aperture in the horn 116, 118. In some embodiments, the enlarged portion is formed by a knot in the extensible member 140. Optionally, the tension in the extensible member may be preloaded by partially stretching the member and tying a knot in the member so that the extensible member is under tension when the horn is in the normal position.

Optionally, at least one side shield 146 may be mounted on the head form 112 (see broken line showing in FIG. 9), and preferably a pair of side shields 146 is employed to simulate the shields that are positioned on live steers to protect the ears of the steer from the rope. The side shields 146 may each be located below one of the horns in when the horn is in the normal position.

The normal position of the horns 116, 118 is suitable for the simulated roping of the horns by a user using a rope formed into a loop or noose, and one or both of the horns may be moved from the normal position to the release position by pulling the constricted loop from the horns, which forces one or both of the horns to move toward each other to minimize the breadth or spread of the horns, thus facilitating the removal of the constricted loop from the horns. The movement of the horns 116, 118 to the respective release positions typically brings the horns into a vertical orientation. If the user is pulling on the rope from a position rearward of the head device, then the horn support 114 is likely to pivot with the horns 116, 118 in a rearward direction. The horns 116, 118 thus pivot upwardly and rearwardly to permit the constricted loop to be pulled from the horns when the rope is pulled away from the horns. Also, if the user holding the ripe has moved to a position lateral to the head device, the far horn may be pivoted to the over-release position by pulling on the constricted loop so that the horns are oriented in substantially the same direction, toward the lateral side where the user is positioned.

The head device 110 may be mounted on the steer assembly 14 in a manner similar to that described above for the head assembly 68, particularly in the manner that permits the head device to pivot with respect to the frame 50 in a gait simulating manner.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A head device for a mechanical steer roping apparatus, comprising:
   a head form;
   a horn support pivotally mounted on the head form so as to be pivotable about a primary axis with respect to the head form;
   a pair of horns mounted on the horn support, the pair of horns being pivotable with respect to the horn support, each of the horns being pivotable about an axis that is oriented substantially perpendicular to the primary axis about which the horn support is pivotable; and
   a biasing member configured to bias the horn support into a position and to bias at least one of the horns into a position.

2. The head device of claim 1 wherein the horn support is pivotable between a forward position and a rearward position, the biasing member resisting movement of the horn support out of the forward position toward the rearward position.

3. The head device of claim 1 wherein each horn being pivotable between a normal position and a release position, the normal position of the horns being characterized by the horns extending in a substantially opposite directions and the release position of the horns being characterized by the horns extending in a direction that is oriented substantially perpendicular to the normal position.

4. The head device of claim 3 wherein a first one of the horns also includes an over-release position characterized by the first horn being oriented in substantially the same direction as a second one of the horns oriented in the normal position.

5. The head device of claim 1 wherein a first horn of the pair of horns being pivotable about a first axis and a second horn of the pair of horns being pivotable about a second axis, the first and second axes being substantially parallel to each other, the first axis and the second axis being oriented substantially perpendicular to the primary axis.

6. The head device of claim 1 wherein the biasing member comprises an extensible member connected to one of the horns and the head form such that pivoting of the horn from the normal position toward the release position stretches the extensible member.

7. The head device of claim 1 wherein the biasing member comprises an extensible member connected to one of the horns and the head from such that pivoting of the horn from the normal position toward the release position stretches the extensible member.

8. The head device of claim 7 wherein the extensible member comprises a resiliently stretchable cord.

9. The head device of claim 7 wherein the head form defines a passage, the extensible member being positioned in the passage of the head form.

10. The head device of claim 1 additionally comprising at least one side shield mounted on the head form, the at least one side shield being located below one of the horns.

11. The head device of claim 1 wherein the horn support is pivotable between a forward position and a rearward position, the biasing member resisting movement of the horn support out of the forward position toward the rearward position;
   wherein each horn being pivotable between a normal position and a release position, the normal position of the horns being characterized by the horns extending in a substantially opposite directions and the release position of the horns being characterized by the horns extending in a direction that is oriented substantially perpendicular to the normal position;
   wherein a first one of the horns also includes an over-release position characterized by the first horn being oriented in substantially the same direction as a second one of the horns oriented in the normal position;
   wherein a first horn of the pair of horns being pivotable about a first axis and a second horn of the pair of horns being pivotable about a second axis, the first and second axes being substantially parallel to each other, the first axis and the second axis being oriented substantially perpendicular to the primary axis;
   wherein the biasing member comprises an extensible member connected to one of the horns and the head form such that pivoting of the horn from the normal position toward the release position stretches the extensible member;
   wherein the extensible member comprises a resiliently stretchable cord;
   wherein the head form defines a passage, the extensible member being positioned in the passage of the head form; and
   at least one side shield mounted on the head form, the at least one side shield being located below one of the horns.

12. A mechanical roping steer apparatus for practicing roping of a steer, the apparatus comprising:
   a support assembly for engaging a ground surface, the support assembly comprising a main frame and a pair of lateral skids mounted on the main frame for contacting the ground surface; and
   a steer assembly located rearwardly of, and being mounted on, the support assembly;
   wherein the steer assembly comprises a frame and a head device mounted on the frame, the head device comprising:
      a head form;
      a horn support pivotally mounted on the head form so as to be pivotable about a primary axis with respect to the head form;
      a pair of horns mounted on the horn support, the pair of horns being pivotable with respect to the horn support, each of the horns being pivotable about an axis that is oriented substantially perpendicular to the primary axis about which the horn support is pivotable; and
      a biasing member configured to bias the horn support into a position and to bias at least one of the horns into a position.

13. The apparatus of claim 12 wherein the head device is configured to move in response to movement of the steer assembly across the ground surface.

14. The apparatus of claim 13 wherein movement of the head device with respect to the frame increases as a speed of movement of the steer assembly across the ground surface increases and decreases as the speed of the steer assembly across the ground surface decreases.

15. The apparatus of claim 13 wherein movement of the head device with respect to the frame comprises an oscillating pivot movement.

16. The apparatus of claim 13 wherein the steer assembly includes a wheel for contacting the ground surface, and wherein rotation of the wheel is configured to cause movement of the head device with respect to the frame.

17. The apparatus of claim 13 wherein the steer assembly additionally comprises a body covering assembly mounted on the frame and configured to move with respect to the frame in response to movement of the steer assembly across the ground surface.

* * * * *